Figure 6:
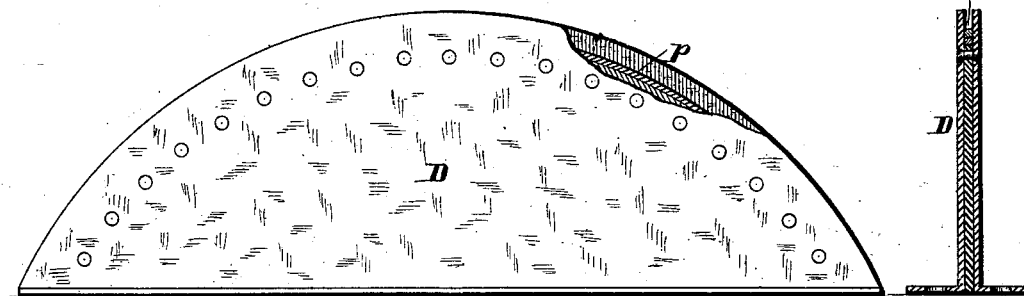

(Model.) 2 Sheets—Sheet 1.
I. P. TURNER.
Method of and Apparatus for Turning Collars and Cuffs.
No. 236,118. Patented Dec. 28, 1880.
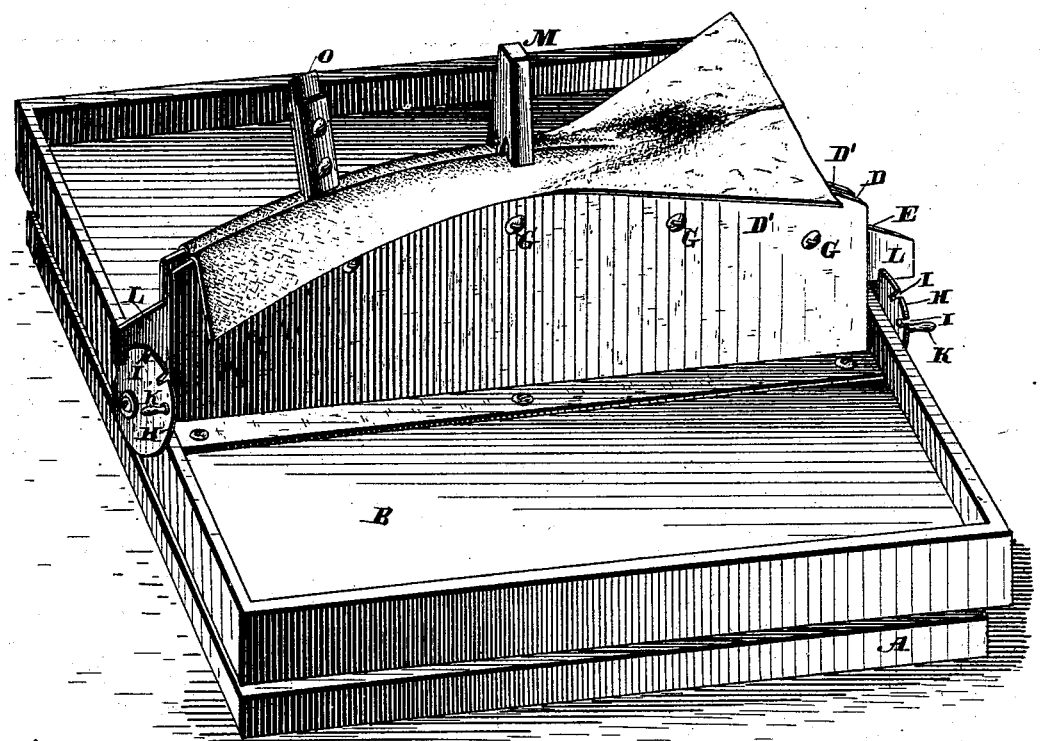
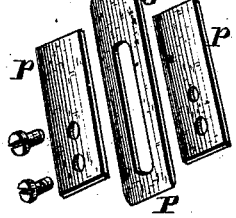
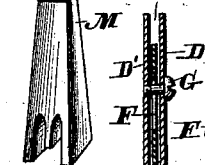
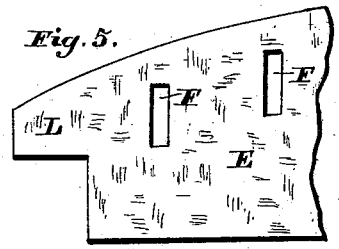
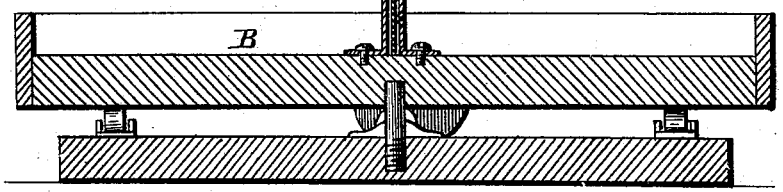
Attest:
J. Henry Kaiser.
A. H. Norris.
Inventor,
Isaac P. Turner
By James L. Norris.
Atty.

(Model.) 2 Sheets—Sheet 2.

I. P. TURNER.
Method of and Apparatus for Turning Collars and Cuffs.

No. 236,118. Patented Dec. 28, 1880.

Attest:
J Henry Kaiser
a. H. Norris

Inventor:
Isaac P Turner,
By James L. Norris,
Atty.

N. PETERS, PHOTO-LITHOGRAPHER, WASHINGTON, D. C.

UNITED STATES PATENT OFFICE.

ISAAC P. TURNER, OF TROY, NEW YORK, ASSIGNOR OF ONE-HALF TO JOHN H. COLBY, OF SAME PLACE.

METHOD OF AND APPARATUS FOR TURNING COLLARS AND CUFFS.

SPECIFICATION forming part of Letters Patent No. 236,118, dated December 28, 1880.

Application filed October 21, 1880. (Model.)

*To all whom it may concern:*

Be it known that I, ISAAC P. TURNER, a citizen of the United States, residing at Troy, in the county of Rensselaer and State of New York, have invented new and useful Improvements in Method of and Apparatus for Turning Collars and Cuffs, of which the following is a specification.

This invention relates to a method of and apparatus for turning collars and cuffs after the plies or blanks thereof have been run or basted together.

Heretofore, after the blanks or plies of a collar or cuff have been run, the united plies have been turned down along a line adjacent to the line of basting, and then the plies have been opened up to the creases formed by such fold, and folded back upon each other face outward, so as to inclose the seam and to form a gutter of more or less depth. After this the article has been ironed out and stitched. But this folding has been done by hand, and hence has involved the employment of skilled labor, considerable time and expense, and the kinks or irregularities along the creases have proved a serious objection to such mode of manufacture.

The object of the present invention is to obviate all of these defects, and to turn the collars or cuffs by mechanical appliances in a more expeditious and better manner than heretofore.

To this end my invention consists, first, in the method of turning collars or cuffs after they have been run, consisting in inserting the edge of the collar or cuff into the channel of a former up to the point where it is desired to crease the plies, then opening the plies and folding them down upon the former, and creasing and smoothing the same by rubbing pressure; second, in an apparatus for turning collars or cuffs, a former provided with a channel along its top edge for receiving the collar to be turned; third, in an apparatus for turning collars, a channeled former, in combination with a vertically-adjustable gage-plate arranged to regulate the depth of the channel; fourth, in an apparatus for turning collars or cuffs, the combination, with a former provided with a channel for receiving the edge of the collar to be turned, of a rotary table upon which the former is secured; fifth, in an apparatus for turning collars or cuffs, the combination, with a channeled former consisting of a pair of plates, an adjustable gage-plate between them, in order to form a channel of greater or less depth, and a pair of eccentrically-pivoted disks arranged adjacent to the ends of the former and formed with notches to receive the ends of the adjustable gage-plate; sixth, in an apparatus for turning collars or cuffs, the combination, with the channeled former and an adjustable gage-plate arranged to determine the depth of the channel, of set-screws for drawing the two plates upon the gage-plate; seventh, in the combination, with the channeled former in an apparatus for turning collars, of a device for forcing the collar into the channel, consisting of a blade extending from a handle; eighth, in the combination, with the channeled former in an apparatus for turning collars, of the herein-described creasing and smoothing device, consisting of a blade secured in a handle recessed at the blade end thereof, at the sides of the blade, and adapted to crease and fold the plies of the collar upon the edges of the channel of the former, all as more fully hereinafter described.

Figure 7:
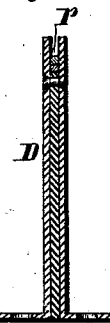
Figure 8:
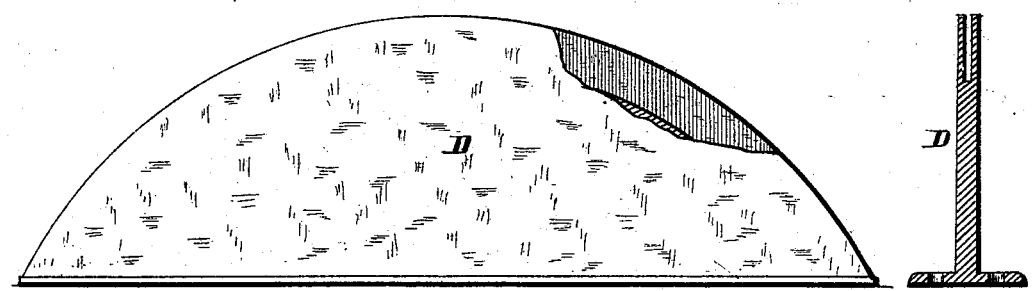
Figure 9:
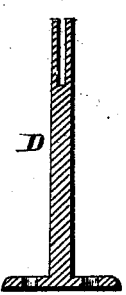
Figure 10:
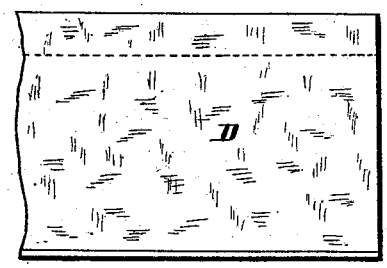
Figure 11:
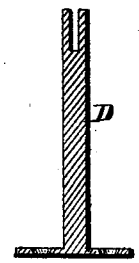
Figure 12:
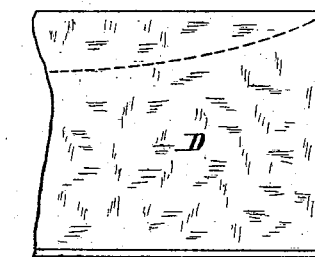
Figure 13:
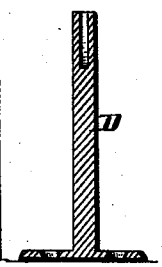
Figure 14:
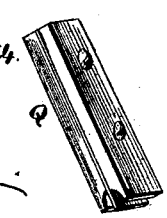

In the drawings, Figure 1 is a perspective view of an apparatus for turning collars constructed in accordance with my improvement. Fig. 2 is a section taken on a vertical plane through the same. Fig. 3 represents the parts detached from each other of a device employed in connection with the apparatus shown in Fig. 1, for gaging the depth of the gutter in the turned part of the collar. Fig. 4 is a perspective view of a device for creasing and smoothing the collar. Fig. 5 is a section of a gage-plate employed in my improved apparatus. Fig. 6 is a side elevation of a modified form of former, with a portion thereof broken away. Fig. 7 is a section taken on a vertical plane through the former shown in Fig. 6. Fig. 8 is a side elevation of a modified form of former, with a portion thereof represented as broken away. Fig. 9 is a section taken on a vertical plane through Fig. 8. Fig. 10 is a side elevation of a portion of a modified form of former; Fig. 11, a vertical section of Fig. 10. Fig. 12 is a side elevation of another modified form of former. Fig. 13 is a vertical section through Fig. 12, and Fig. 14 is a perspective view of the creasing and smoothing device.

The letter A indicates an ordinary bed or table, upon which my apparatus is swiveled for convenience in operating the same, as will be presently explained. The portion of the apparatus which is swiveled upon this bed consists of the revolving table B, preferably provided with rails or guards along its edges, so as to prevent the collars from being brushed off from the table.

To the rotary table is secured a former, D, consisting of two vertical plates, D' D', fastened to the table by means of bolts or screws passed through flanges at the lower edges of the plates, or in any other suitable way. These vertical plates are arranged in parallel planes, with a space between their opposing faces, so as to constitute, in effect, a channeled former, and they are made with curved upper edges, corresponding to the curvature of the collar to be turned; or they may have straight upper edges, so as to adapt them for straight collars or cuffs.

Between the plates D' D' is arranged a vertically-movable gage-plate, E, having its upper edge made to correspond with the lines of the upper edges of the vertical plates. This gage-plate is formed with any desired number of slots, F, through which pass the bolts or set-screws G, arranged to work through the vertical plates. The functions of these screws are to draw the vertical plates together upon the gage-plate, so as to hold the gage-plate in adjustment, and thus maintain the upper edge of the gage-plate at a predetermined distance below the upper edges of the vertical plates D', in order to regulate the depth of the channel in the former.

Upon the sides of the rotary table which are at the ends of the former are the eccentrically-pivoted disks H H, each formed with a series of notches, I, and provided with a handle, K, for the purpose of enabling the operator to readily turn the disks about their pivots. The gage-plate has its ends L projecting out from between the ends of the vertical plates of the former, these ends of the gage-plate being extended so as to engage notches in the disks, whereby, by turning the disks in one direction, the gage-plate will be raised to a height determined by the notches with which it engages; or if the disks are turned so that all of their notches have passed the gage-plate, then the smooth faces of the disks will act upon the ends of the gage-plate so as to raise the latter.

The devices shown in Figs. 3, 4, and 14 will be described in connection with the operation of turning the collars according to my improvement, which is as follows: The blanks or plies of the collar or cuff, after being cut out and run as usual, are then, with their face sides together, inserted to some extent into the channel of the former, so as to pass the line of primary stitching or basting down into the said channel, the depth of which is determined by the position of the gage-plate, which can be adjusted by operating the disks, as before described, and rigidly secured in place by tightening up the screws which pass through the gage-plate and the walls of the former.

In Fig. 1 I have illustrated the collar as being turned. The first step after inserting the collar, as just described, is to hold it down upon the former at a central point by means of a holding-pin or a three-pronged block or plate, M, the central prong of which is forced down between the inner faces of the plies lying in the channel, and the outer longer prongs of which clasp the blanks or plies of the collar or cuff upon the outer sides of the former. I then employ a gage, O, consisting of a blade, P, secured in a suitable handle, preferably consisting of two plates, $p$. The length of the blade projecting out from the handle is, by preference, adjustable, and to such end the shank of the blade is slotted and set-screws passed through the handle and the slots of the blade. This gage may, however, be made solid, and different gages used having a length of blade corresponding with the depth of the channel and of the gutter to be formed in the collar or cuff.

This device is used as follows: The blade is inserted between the inner faces of the plies and pressed down up to the shoulder formed by the outer plates, so as to force the collar or cuff well down into the channel, and it is then run along to the ends of the plates D, from one side of the center of the collar, so as to force the plies into the channel up to the lines to be creased. By now partially rotating the table the apparatus will be brought in position to admit of the repetition of said operation at the other side of the holding-pin. I then take the creaser and smoother Q, which consists of a similarly-constructed device, with the exception that the blade end of the handle is recessed at two sides of the blade, so as to form curved shoulders for folding and creasing the plies upon the edges of the vertical plates, and also for effectively smoothing out all wrinkles in the fabric, which is accomplished by using the device in a manner similar to that just described with reference to the gage or touching-in device. In using this creasing and smoothing device the rotary table can be turned, as before, so as to bring the collar in convenient position to be operated upon. In running the creaser and smoother along the collar, the material will be stretched from the center, thus taking out all wrinkles, and it will be found that the edge formed by these creases will be slightly longer than the edge of the collar along its united portion prior to the operation just described, and hence there will be no kinks or wrinkles whatsoever along the lines of creases.

It is obvious that numerous minor changes might be made in the construction of this apparatus without departing from the spirit of my invention—as, for instance, the two vertical plates can be riveted together, as shown in Figs. 6 and 7, and in lieu of the adjustable gage between said plates the space between them may be built up to the required height with strips r, of rubber, leather, or other elastic packing, so as to determine the depth of the channel in the former; or, in place of this mode of construction, a solid channeled former may be employed, as shown in Figs. 8 and 9. In this latter instance the solid former is made with a channel of the required depth along its upper edge.

In Figs. 10 and 11 I have represented the former as being made with straight upper edges, and the bottom of the channel made straight to correspond with such straight edges, as shown in dotted lines.

In Figs. 12 and 13 the bottom of the channel is made deeper at the center, so as to conform to the other forms of collars. Hence, while in the main illustration of the machine the adjustable gage between the plates is used to regulate the depth of the channel in the former, yet it is obvious that such might be dispensed with.

The rotary disks could also be provided with locks or catches, if desired, so as to lock them in position.

Also, one of the upper edges of the plates might be made somewhat lower than the other, so as to form what is known as a "bead" along the edge of the turned edge of the collar or cuff.

What I claim is—

1. The method of turning collars or cuffs after they have been run, consisting in inserting the edge of the collar or cuff into the channel of a former up to the point where it is desired to crease the plies, then opening the plies, folding them down upon the former, and creasing and smoothing the same by rubbing pressure, substantially as described.

2. In an apparatus for turning collars or cuffs, a former provided with a channel along its top edge for receiving the collar to be turned, substantially as described.

3. In an apparatus for turning collars, a channeled former, in combination with a vertically-adjustable gage-plate arranged to regulate the depth of the channel, substantially as described.

4. In an apparatus for turning collars or cuffs, the combination, with a former provided with a channel for receiving the edge of the collar to be turned, of a rotary table upon which the former is secured, substantially as described.

5. In an apparatus for turning collars or cuffs, the combination, with a channeled former, consisting of a pair of plates, an adjustable gage-plate between them in order to form a channel of greater or less depth, and a pair of eccentrically-pivoted disks arranged adjacent to the ends of the former, and formed with notches to receive the ends of the adjustable gage-plate, substantially as described.

6. In an apparatus for turning collars or cuffs, the combination, with the channeled former and an adjustable gage-plate arranged to determine the depth of the channel, of set-screws for drawing the two plates upon the gage-plate, substantially as described.

7. The combination, with the channeled former in an apparatus for turning collars, of a device for forcing the collar into the channel, consisting of a blade extending from a handle, substantially as described.

8. The combination, with the channeled former in an apparatus for turning collars, of the herein-described creasing and smoothing device, consisting of a blade secured in a handle recessed at the blade end thereof, at the sides of the blade, and adapted to crease and fold the plies of the collar upon the edges of the channel of the former, substantially as described.

In testimony whereof I have hereunto set my hand in the presence of two subscribing witnesses.

ISAAC P. TURNER.

Witnesses:
JAMES L. NORRIS,
JAMES A. RUTHERFORD.